Feb. 23, 1926.
W. FRENSDORFF
1,574,242
ELECTRIC DRIVING INSTALLATION
Filed July 23, 1925   3 Sheets-Sheet 1
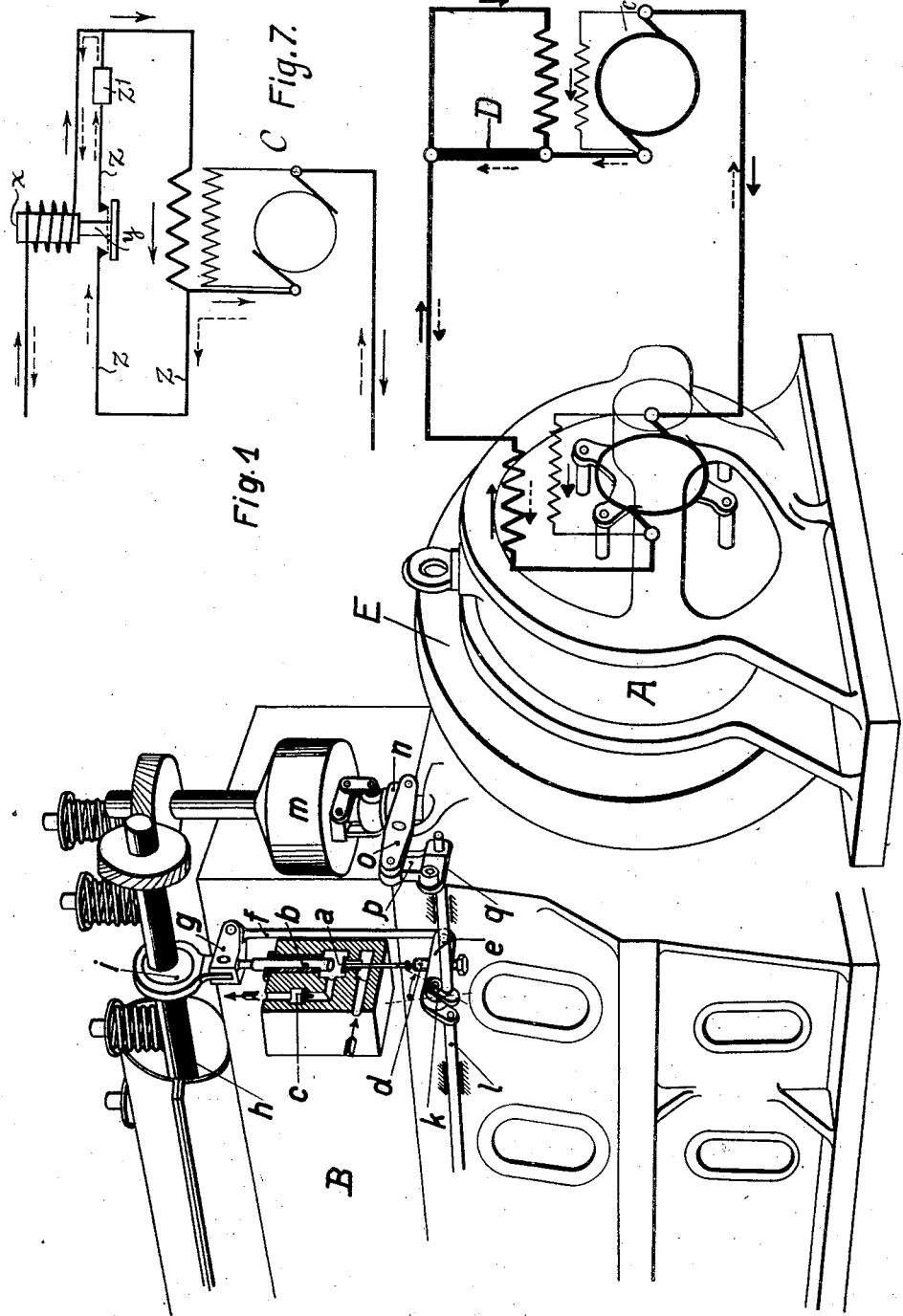

Feb. 23, 1926.
W. FRENSDORFF
1,574,242
ELECTRIC DRIVING INSTALLATION
Filed July 23, 1925    3 Sheets-Sheet 2

Inventor:
Willy Frensdorff
By
Attorney.

Feb. 23, 1926.

W. FRENSDORFF 1,574,242

ELECTRIC DRIVING INSTALLATION

Filed July 23, 1925    3 Sheets-Sheet 3

Inventor.
Willy Frensdorff
By
Attorney

Patented Feb. 23, 1926.

1,574,242

UNITED STATES PATENT OFFICE.

WILLY FRENSDORFF, OF BREMEN, GERMANY, ASSIGNOR TO ACTIEN-GESELLSCHAFT "WESER," OF BREMEN, GERMANY, A CORPORATION OF GERMANY.

ELECTRIC DRIVING INSTALLATION.

Application filed July 23, 1925. Serial No. 45,581.

*To all whom it may concern:*

Be it known that I, WILLY FRENSDORFF, a citizen of the Republic of Germany, residing at Bremen, Germany, have invented certain new and useful Improvements in Electric Driving Installations (for which I have filed applications in Germany Oct. 15, 1923, and June 6, 1925), of which the following is a specification.

The purpose of the invention is to make use of the return current generated in electric drives operating with direct current compound machines, in particular installations for driving ship cranes, during lowering, for decreasing the load on the dynamo and on the prime mover thereof. It is known that hoisting motors generate energy during lowering of a heavy load or at great lowering speeds, so that they operate as generators. With direct current motors this energy can either be returned to the network or dissipated by connecting a resistance across the armature (lowering brake connection).

In many installations the Leonard connection is provided, in which each working motor receives its current from a particular separately excited direct current shunt dynamo coupled to a driving engine. Each increase in speed of the working motor, in particular in lowering, causes with this arrangement, a direct return of current to the said shunt dynamo, the voltage of which is increased. Special arrangements are necessary therefore to regulate the voltage of the dynamo, and thereby the speed of the driving motor at the same time.

In addition, buffer arrangements have been provided for the driving engines in order to ensure levelling of the peak by corresponding automatic increase in the driving energy supply in the case of higher loads than correspond to the highest basic loads. In all other cases arrangements are necessary to dissipate the returned current during lowering, or additional current using apparatus must be connected in.

In ship installations, where in addition to winding motors, working motors of various kinds (lighting machines, pumps, air supply, etc.) are supplied from the same supply network and in consequence the maintenance of as constant as possible supply voltage above all is aimed at, compound machines are generally used as the source of energy. In such cases the dynamo is generally driven by a Diesel motor. Apart from the above described security arrangements among other things, self acting cutouts which limit the return current in the supply network have been used as a security against damage by return current in such ship installations. Such an arrangement can only be regarded as an emergency aid however. The employment of the Leonard connection, which requires a special dynamo with a special driving engine, for each working motor and correspondingly increased attention, is not desirable in ship installations due to economy and space. On the same grounds additional current users for taking the return current must be avoided.

According to this invention in such a ship installation the series winding of the dynamo is used to permit a return of current to the dynamo from the winding motors engaged in lowering, thereby effecting corresponding decrease in load on the dynamo and in the driving engine coupled thereto. For this purpose the dynamo is provided with arrangements which permit the return currents in the series winding and the armature of the dynamo caused by the counter E. M. F. generated by the winding motors, to be used as energy for driving the dynamo as a motor, with corresponding simultaneous relief in the load on the driving engine, without the fear of pole reversal. At the same time the governor of the driving engine is coupled with the driving fluid supply in suitable known manner so that the supply is reduced correspondingly with the relief of the load by the back current and in the limiting case completely cut off. In this case the dynamo running as a motor takes over at the same time in certain circumstances, that is with sufficiently high counter E. M. F., the light running load of the driving engine. With this arrangement all damage in ship installations due to return current is avoided and special arrangements for its avoidance are rendered unnecessary, while at the same time the use of the back current to relieve the load in the driving engine is achieved without complicated, space occupying and expensive special arrangements.

The invention is diagrammatically illustrated in Figure 1 of the accompanying drawings.

Fig. 7 is a wiring diagram showing the protection control.

Figure 4:
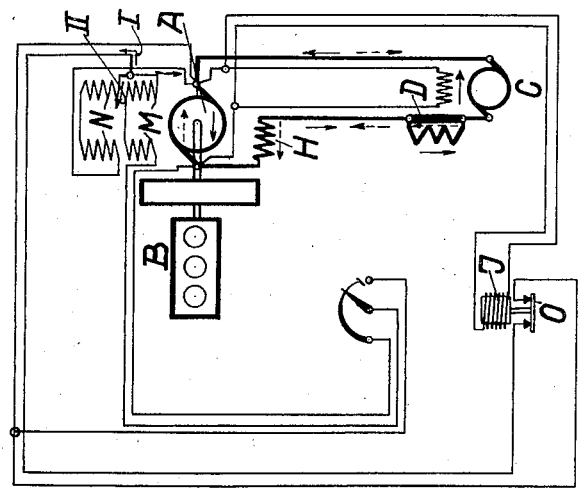
Figs. 3 to 6 show wiring diagrams for preventing pole reversal.

The dynamo is a direct current machine A having a series and shunt winding, directly coupled to an internal combustion motor B which is the driving engine. The working motors C (only one is shown in the drawing) are compound wound corresponding to the dynamo. In their series leads a bridge D of known kind (protection control) which comes into action during current return, is provided to by-pass the series winding.

The bridge D is illustrated in Fig. 7 taken in connection with Fig. 1 in which a coil $x$ is provided in the main circuit, the armature $y$ of the coil maintaining the circuit $z$ broken during normal conditions. As soon as the return current increases to a specific strength, the coil $x$ will draw up the armature $y$ so that the circuit $z$ will be closed. The reverse current will then flow in the direction indicated by the broken line arrows in order to follow the path of least resistance. In the circuit $z$ a shunt $z'$, of known construction, can be inserted in order to further limit the return current.

The working method is such that with positive loading of the working motors C and the dynamo A driven by the Diesel motor B, the motors C and dynamo A operate in known manner as double circuit machines (current direction shown in solid line arrows). If the working motors are under a high negative load, which is the case for example when a certain number of cranes are simultaneously lowering loads or are running down at a high speed, then, as is known, an increased terminal voltage is generated in the armatures of the particular working motors C, so that these motors run as self excited generators. This voltage increase when sufficiently strong causes a back current (direction shown by broken line arrows) to pass over the protector D into the supply network and flow through the series winding and armature of the dynamo A and according to its strength in the series winding it temporarily more or less weakens the total field of the dynamo. In these cases the dynamo runs temporarily as a motor as long as the counter E. M. F. is sufficiently great. In this case at the same time the load on the Diesel motor driving the dynamo is relieved by the same amount, and this relief in load due to back current may go so far that the motor takes over the total work of the driving motor including its internal resistances. The relief in load of the dynamo and of the driving motor manifests itself in an attempt to increase the speed. Immediately this moment arrives, a corresponding regulation of the driving fluid supply takes place. For this purpose the governor of the Diesel motor is so coupled by any desired suitable means with the fuel supply that it automatically reduces this in accordance with the relief of the load, and cuts it off entirely, as soon as the dynamo takes over the total light running working of the Diesel motor.

Figure 2:
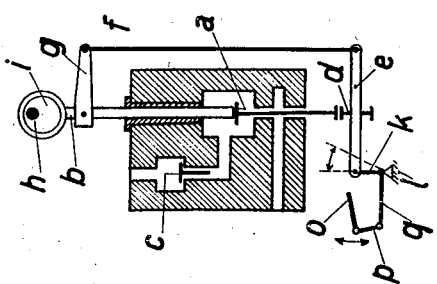
Figure 2 shows diagrammatically the limiting position of the member controlling the driving fluid supply to the driving engine, with complete unloading of the engine.

An example of such governing, in itself known, is shown in the drawings. The supply of fuel in Diesel motors takes place in known manner by a suitable number of fuel pumps to each of which the fuel is supplied through a suction valve $a$. The fuel is fed to the fuel valve of the engine by the pump piston $b$ through a pressure valve $c$. The regulation of the fuel supply in such cases takes place by controlling the closing of the suction valve $a$ and thereby the quantity delivered. The control of the suction valve $a$ is effected by an abutment $d$ acting on the stem of the valve and mounted on a lever $e$ of which one end is under control by means of the rod $f$ and arm $g$, of the pump eccentric $i$ driven by the control shaft $h$. The suction valve can only close and the pump deliver when the abutment $d$ no longer bears on the stem of the suction valve $a$. The time of closing of the valve is varied by displacement of the pivot of the lever $e$. For this purpose the pivot is carried by a lever arm or crank $k$ which is fast on a shaft $l$ which is operated by the governor $m$. The crank or lever $k$ can be moved in this way between the positions indicated by the double headed arrow. The uppermost position of the crank is the limiting one in which the pump is completely inoperative, that is the fuel supply is cut off. In this case the suction valve is still held open when the piston $b$ has completed its pressure stroke. This position is shown in Figure 2. This occurs when, as above set forth, the back current produced in the dynamo by the counter E. M. F. is so great that the dynamo operates as a motor, completely relieves the driving engine and then takes over the light-running work thereof. If on the other hand the crank or lever B is below the upper position, the suction valve $a$ will close and cause the delivery of fuel at each stroke. The quantity delivered increases as the pivot of the lever $e$ is lowered.

The operation of the regulating shaft $l$ is effected automatically by the governor $m$. The governor sleeve $n$ is connected with the shaft $l$ for this purpose through a lever transmission $o$, $p$, $q$. This transmission is so arranged that the upper position of the sleeve corresponds to the upper position of the crank $k$ and the lower position of the sleeve with the lower position of the crank $k$.

In order to prevent unpermissible variations in the speed of the motor through sudden strong surges of current, which the governor cannot immediately follow, a suitably dimensioned fly wheel E can be interposed in known manner between the dynamo and the driving engine.

The nature of the influence of the series fields on the operation of machines A and C is a direct or immediate influence in view of the fact that the machines are compound wound.

The speed of the dynamo and the voltage of the supply network nevertheless remain practically constant with this arrangement, since during delivery of return current, the hoisting motors, acting as dynamos, maintain the voltage in the network and only the current direction is reversed. A reversal of polarity of the main dynamo is avoided by suitably designing its series winding in relation to its shunt winding, bearing in mind the maximum back current to be expected, so that only a weakening of the total field up to an allowable limit can take place. Since the loading in ship hoisting installations varies very considerably and in consequence the value of the return current can only be determined beforehand with great difficulty, for security a shunt in permanent connection, or automatically connected by the return current, can be provided for the series winding of the dynamo which receives the return current, in order to permit the relation between the series winding and the shunt winding to be correctly adjusted on the testing switchboard and thereby prevent the destruction of the total field in all cases.

This above described adjustment or shunt of the series winding involves in many cases, however, an undesirable weakening of the compounding of the dynamo for maintenance of the necessary constant operating voltage. In order to avoid this disadvantage the arrangements shown in Figures 3 to 6, can be made use of. These are characterized by arrangements which prevent pole reversal and are directly or indirectly operated without breaking the circuit, by the return current itself when its danger value is reached. In this case then the compounding of the current supplying dynamo can always be designed without consideration of the return current, so as to be the most suitable for the particular installation. The said arrangements then come automatically into action only when the return current grows so great that an unpermissible drop in the operating voltage causes the danger of a reversal of polarity. The maintenance of a practically constant operating voltage for all installation conditions is in this way ensured.

These arrangements correspond essentially to the already described example of Figure 1. Nevertheless the dynamo A always has the most suitable unweakened compounding for the installation conditions for the time being. A magnetic switch controlled by the return current is connected across the terminal voltage of the main dynamo, which switch connects in the protection devices on unpermissible growth of the return current.

Figure 3:
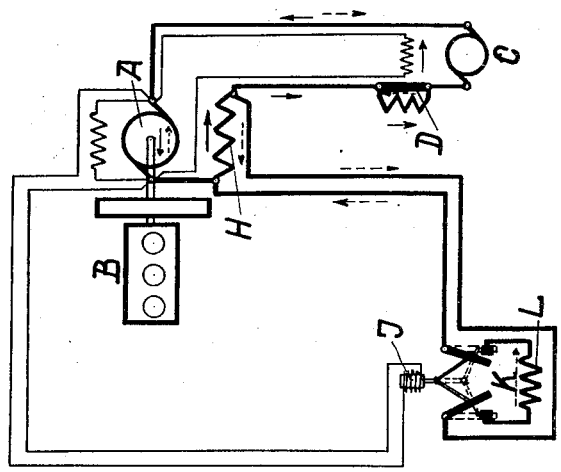

For this purpose, for example according to Figure 3, there is a protection switch K, the voltage winding J of which releases the armature at a predetermined low voltage limit—corresponding to a predetermined return current strength—whereby a resistance L is connected in parallel with the series winding H, or the latter entirely by-passed. The return current then flows, as the broken line arrows show, partly through the series winding of the dynamo, and partly through the resistance L, or entirely through the by-pass. In this way the return current in the series winding is weakened to the allowable value or entirely cut off.

In the example shown in Figure 4 the shunt winding M of the dynamo A is connected in series with an additional field winding N, which at normal voltage is short circuited by the relay O controlled by the voltage winding J. The current then branches off from the main shunt field in the direction of the arrow I. As soon as the voltage in the field M drops corresponding to a limiting value in the return current and the connection O is broken, the current flows from the shunt field M in the direction of the arrow II through the additional field N, whereby the ampere turns of the shunt field are maintained at the required value.

Figure 5:
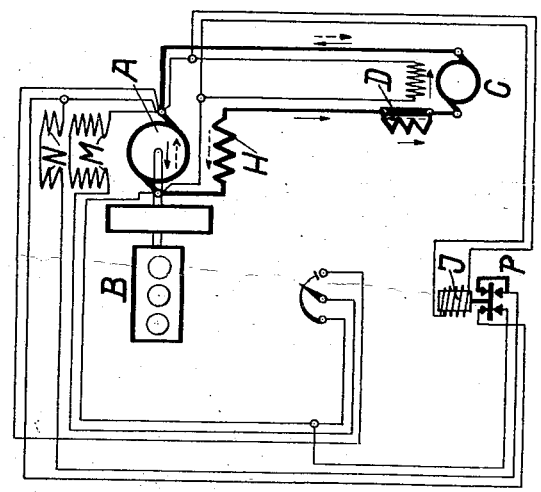

The example shown in Figure 5 also makes use of an additional field winding N, which is here connected in parallel with the shunt field M, and on voltage drop is cut in by the switch P operated by the voltage winding J, as shown in Figure 5. In this way the current strength in the shunt field is raised by increase in the ampere turns and in consequence the field weakening due to the return current in the series winding is compensated. If the winding J again attracts its armature the field N is cut out and to avoid undesirable induced voltages is short circuited across itself.

Figure 6:
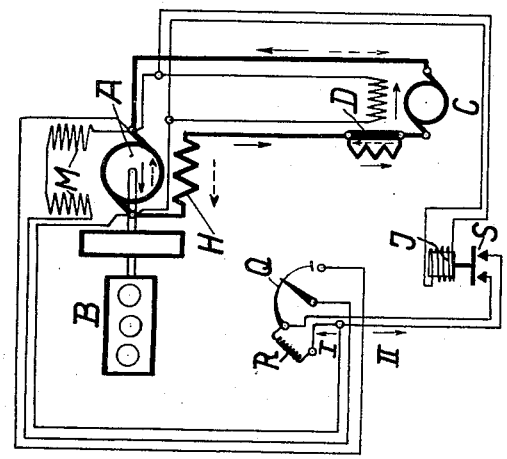

According to Figure 6 the shunt field M is connected to the voltage regulator Q through a resistance R, which in normal circumstances weakens the field by a predetermined amount. It is here assumed that in normal circumstances the dynamo reaches the normal voltage with a weakly saturated field. The resistance R weakens the field to such a degree (current direction shown by arrow I) that it has the correct strength for normal voltage. If now at a certain value of return current the voltage tends to drop, the resistance R is short circuited by the relay S. The current in the shunt circuit then flows in the direction of the arrow II, by-passing the resistance R. In this way the field M is raised to the full ampere turns value to compensate for the weakening due to the return current and the field is fully saturated.

The arrangements according to Figures 3 to 6 can incidentally be used in all installations in which compound machines are used in which return current is produced.

What I claim is:—

1. An electric driving installation comprising a dynamo having a series and a shunt winding; a compound wound working motor; a relay connected across said dynamo; a circuit for said dynamo and motor whereby the series winding of the dynamo is adapted to weaken the field strength of said dynamo so that the return current from the motor, when acting as a dynamo, flows through the series winding and the armature of the dynamo in order to operate it as a motor; and means for preventing reversal of polarity by the return current when it reaches a dangerous point comprising a resistance which is adapted to be connected into said circuit by said relay.

2. An electric driving installation comprising a dynamo having a series winding; a working motor; a relay connected across said dynamo; a circuit for said dynamo and motor whereby the series winding of the dynamo is adapted to weaken the field strength of said dynamo so that the return current from the motor, when acting as a dynamo, flows through the series winding and the armature of the dynamo in order to operate it as a motor; and means for preventing reversal of polarity by the return current when it reaches a dangerous point comprising a resistance which is adapted to be connected into said circuit by said relay.

3. An electric driving installation comprising a dynamo having a series winding; a working motor; a circuit for said dynamo and motor whereby the series winding of the dynamo is adapted to weaken the field strength of said dynamo so that the return current from the motor, when acting as a dynamo, flows through the series winding and the armature of the dynamo in order to operate it as a motor; and a resistance in said circuit connected in parallel with the series winding of the dynamo which is automatically brought into action when a limiting value of the return current is reached.

4. An electric driving installation comprising a dynamo having a series and a shunt winding; a compound wound working motor; a circuit for said dynamo and motor whereby the series winding of the dynamo is adapted to weaken the field strength of said dynamo so that the return current from the motor, when acting as a dynamo, flows through the series winding and the armature of the dynamo in order to operate it as a motor; and a resistance in said circuit connected in parallel with the series winding of the dynamo which is automatically brought into action when a limiting value of the return current is reached.

In testimony whereof I affix my signature.

WILLY FRENSDORFF.